(12) United States Patent
Wang

(10) Patent No.: US 12,476,653 B1
(45) Date of Patent: Nov. 18, 2025

(54) METHODS AND CIRCUITS FOR INNER-EYE TIMING CENTER DETECTION AND CLOCK PHASE ALIGNMENT

(71) Applicant: Cadence Design Systems, Inc., San Jose, CA (US)

(72) Inventor: Nanyan Wang, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 158 days.

(21) Appl. No.: 18/532,565

(22) Filed: Dec. 7, 2023

Related U.S. Application Data

(60) Provisional application No. 63/431,549, filed on Dec. 9, 2022.

(51) Int. Cl.
| | | |
|---|---|---|
| H03M 7/46 | (2006.01) | |
| H03L 7/08 | (2006.01) | |
| H04B 10/524 | (2013.01) | |
| H04B 10/54 | (2013.01) | |
| H04L 25/49 | (2006.01) | |
| H04L 27/06 | (2006.01) | |

(52) U.S. Cl.
CPC ............ *H03M 7/46* (2013.01); *H03L 7/0807* (2013.01); *H04B 10/524* (2013.01); *H04B 10/541* (2013.01); *H04L 25/4917* (2013.01); *H04L 27/06* (2013.01)

(58) Field of Classification Search
CPC ... H04L 25/4917; H04L 7/0337; H04L 27/06; H04L 7/0334; H04L 25/49; H04L 7/0083; H04L 5/0048; H03L 7/0807; H04B 10/524; H04B 10/541; H03M 7/46
USPC .......................................................... 341/95
See application file for complete search history.

(56) References Cited

U.S. PATENT DOCUMENTS

| | | | |
|---|---|---|---|
| 11,477,059 B2* | 10/2022 | Wang | ..................... H04L 7/0337 |
| 11,658,795 B2* | 5/2023 | Kim | ......................... H03K 5/13 |
| | | | 375/371 |

* cited by examiner

*Primary Examiner* — Khai M Nguyen
(74) *Attorney, Agent, or Firm* — Mark H. Whittenberger; Holland & Knight LLP

(57) ABSTRACT

A receiver may sample an amplitude-modulated input signal expressed as a series of symbols using a clock signal with edges aligned to the symbols. Repeated symbols and the level transitions between them may form signal eyes. The receiver may detect the inner signal eyes and aligns the phase of the clock signal relative to the symbols responsive to the detected timing center of signal eyes and corresponding symbol patterns.

20 Claims, 10 Drawing Sheets

METHODS AND CIRCUITS FOR INNER-EYE TIMING CENTER DETECTION AND CLOCK PHASE ALIGNMENT

RELATED APPLICATION(S)

This application claims the benefit of U.S. Provisional Application No. 63/431,549, filed 9 Dec. 2022, the entire contents of which is incorporated herein by reference.

BACKGROUND

Binary communication systems represent information using just two symbols—e.g., relatively high and low voltage levels-to alternatively represent a logic one and a logic zero (i.e., 1b or 0b, where "b" is for binary). The number of voltage levels used to represent digital data is not limited to two, however. For example, a type of signaling referred to as PAM-4 (pulse-amplitude modulation, four levels) divides the voltage range over which a signal transitions into four sub-ranges, or levels, each level representing a different combination of two binary bits (i.e., 00b, 01b, 10b, or 11b). A series of two-bit symbols can thus be communicated as a voltage signal that transitions between four levels that represent the symbols. The symbols are of equivalent duration, termed the "unit interval," and are communicated at a symbol rate, or "baud."

Digital receivers categorize each incoming symbol by sampling the signal's voltage during the corresponding unit interval. PAM-4 receivers compare each symbol to three symbol-decision thresholds that divide the signal's swing into the four ranges, and thus discover the two-bit value of the symbol. The sample instants are carefully timed to the symbols using edges of a periodic clock signal. Precise synchronization between the symbols and clock edges is critical for reducing errors and increasing speed performance.

SUMMARY

In one or more embodiments of the present disclosure, a receiver is provided. The receiver may include an input node to receive an amplitude-modulated input signal expressed as a series of symbols, each symbol representing N-bit data and the symbols collectively forming signal eyes. The receiver may further include a data-recovery circuit to convert the amplitude-modulated input signal into an M-bit digital signal in time with a clock signal phase aligned with the symbols, where M is greater than N, and to convert the M-bit digital signal to an N-bit digital signal. The receiver may also include a clock-recovery circuit to phase align the clock signal and an inner-eye phase-adjustment circuit coupled to the data-recovery circuit and the clock-recovery circuit, the inner-eye phase adjustment circuit to detect the signal eyes from the M-bit digital signal and adjust the phase of the clock signal responsive to the detected symbol eyes.

One or more of the following features may be included. In some embodiments, the clock-recovery circuit may include an equalizer coupled to the data-recovery circuit to equalize P bits of the M-bit digital signal, where P is less than or equal to M. The equalizer may include at least one tap, wherein the inner-eye phase-adjustment circuit adjusts the at least one tap responsive to the detected symbol eyes. The inner-eye phase-adjustment circuit may include an inner-eye boundary filter to detect an amplitude of the eyes and an inner-eye misalignment detector to detect a phase error between the eyes and the clock signal. The eyes have an average eye area, wherein the eye area is a product of eye amplitude and eye duration, and the inner-eye boundary filter filters areas smaller than the average eye area.

In another embodiment of the present disclosure, a receiver is provided. The receiver may include a data-recovery circuit to receive an amplitude-modulated input signal expressed as a series of symbols, each symbol representing N-bit data, the data-recovery circuit including. The receiver may further include an analog-to-digital converter to digitize the amplitude-modulated input signal to an M-bit digital signal, where M is greater than N, in time with a receive clock signal phase aligned with the symbols. The receiver may also include a data equalizer to equalize the M-bit digital signal to produce an M-bit equalized signal expressing the series of symbol as a series of digital values, the series of digital values collectively forming symbol eyes. The receiver may further include a decision circuit to convert the M-bit equalized signal to an N-bit received signal and a clock-recovery circuit coupled to the data-recovery circuit to phase adjust the receive clock signal with the symbols responsive to at least P bits of the M-bit digital signal. The receiver may further include an inner-eye phase-adjustment circuit coupled to the data-recovery circuit to detect the timing of the symbol eyes and coupled to the clock-recovery circuit to phase adjust the receive clock signal responsive to the detected timing of the symbol eyes.

One or more of the following features may be included. In some embodiments, P is less than or equal to M, the clock-recovery circuit including a clock-recovery equalizer to equalize the P bits of the M-bit digital signal to produce a P-bit equalized signal expressing the series of symbol as a second series of digital values. The receiver may include a receiver-adaptation circuit coupled to the data-recovery circuit and the clock-recovery circuit to phase adjust the receive clock signal responsive to the M-bit equalized signal and the N-bit received signal. The receiver may also include a phase detector coupled to the data-recovery circuit to phase adjust the receive clock signal responsive to the N-bit received signal and sampled edges of the amplitude-modulated input signal. In some embodiments, N is two, P is greater than two, and M is greater than or equal to P. The inner-eye phase-adjustment circuit may include an inner-eye boundary filter to detect the symbol eyes and an eye-misalignment detector to detect a misalignment between the timing center of inner symbol eyes and edges of the receive clock signal. The receiver may include a low-pass filter coupled the misalignment detector to initiate the phase adjustment to the receive clock signal when the misalignment is detected an accumulated number of times.

In yet another embodiment of the present disclosure, a receiver is provided. The receiver may include a data node to convey an amplitude-modulated signal expressed as a series of symbols and symbol transitions, each symbol representing N-bit data. The receiver may further include a data sampler to issue data samples of the symbols and an edge sampler to issue edge samples of the symbol transitions. The receiver may also include a clock-recovery circuit coupled to the data sampler and the edge sampler, the clock-recovery circuit to issue a data clock signal to the data sampler and an edge clock signal to the edge sampler. The receiver may further include an inner-eye phase-adjustment circuit coupled to the data sampler and the clock-recovery circuit, the inner-eye phase-adjustment circuit to detect voltages and timings within the symbol eyes and phase adjusting the data clock signal responsive to the detected voltages and timings.

One or more of the following features may be included. In some embodiments, the receiver may include an analog front end to receive an input signal and convey the amplitude-modulated signal responsive to the input signal. The inner-eye phase-adjustment circuit including an inner-eye boundary filter to sense the symbol transitions. The sensed transitions may be a subset of the set of the transitions. The receiver may include an inner-eye misalignment detector coupled to the inner-eye boundary filter to detect a timing misalignment between the symbols and the data clock signal. The receiver may also include a misalignment-correction circuit coupled to the inner-eye misalignment detector to issue a phase-offset signal to the clock recovery circuit responsive to the detected timing misalignment. The misalignment-correction circuit may include a scheduler to schedule the issuance of the phase-offset signal to the clock-recovery circuit. Each of the symbols may represent two-bit data.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

Figure 1:
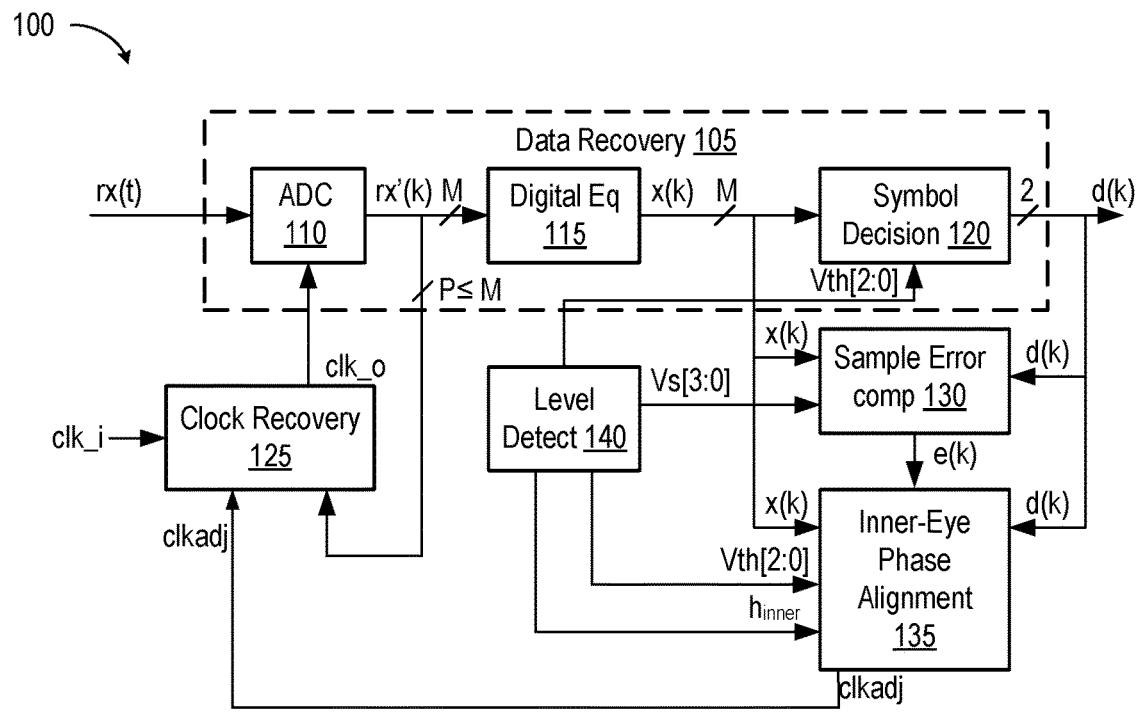
FIG. 1 depicts a PAM-4 receiver 100 with an input node rx(t) that receives a like-identified, amplitude-modulated input signal expressed as a series of symbols. Each symbol is expressed as four signal levels.
Figure 1:
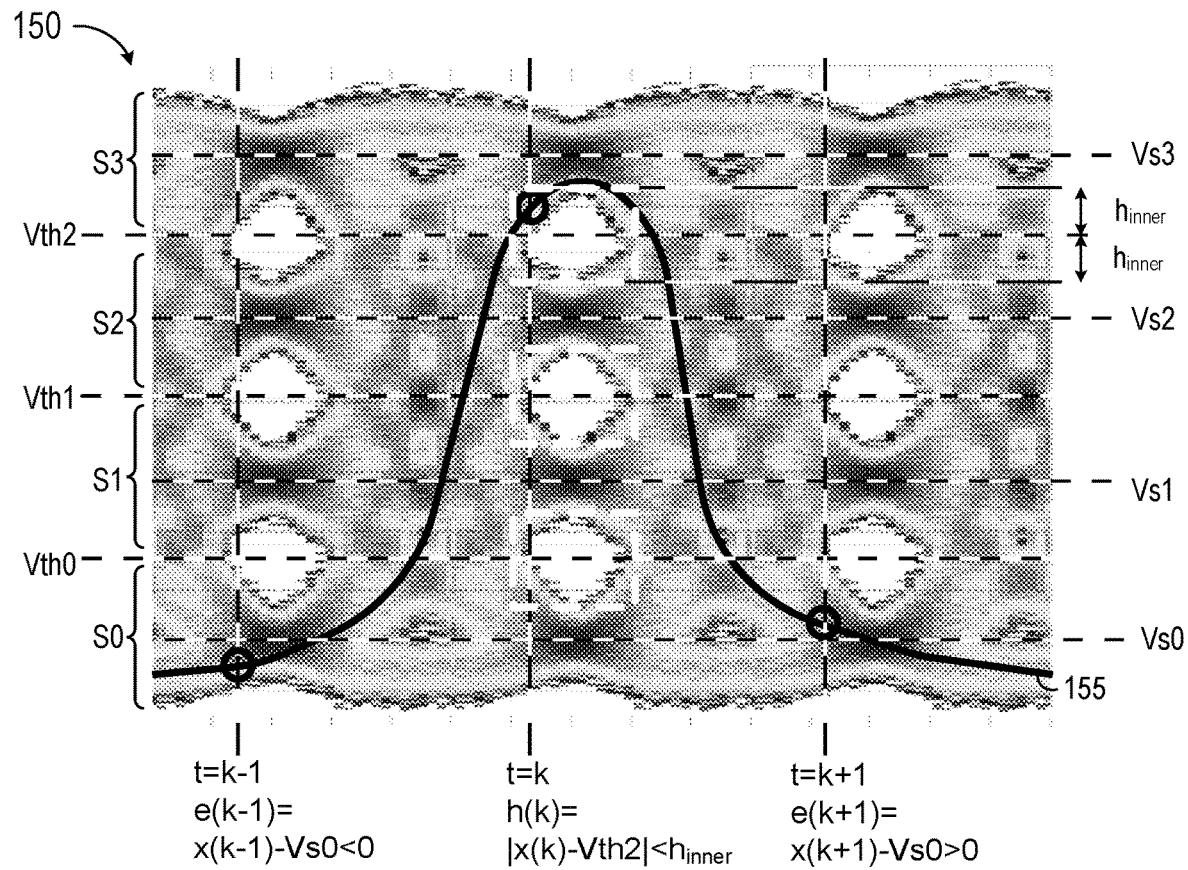

FIG. 1 depicts a PAM-4 receiver 100 with an input node rx(t) that may receive a like-identified, amplitude-modulated input signal expressed as a series of symbols. Each symbol may be expressed as one of four signal levels. Patterns of symbols and the level transitions between them collectively may form signal eyes, areas in time and amplitude that signal rx(t) rarely crosses. In practice, an eye may be deemed "open" if the bit-error rate (BER) for receiver 100 meets some desired specification. A waveform diagram 150—a so-called "eye diagram"—may include an array of nine signal eyes (white eye-shaped areas) amid repeated paths of signal rx(t). The vertical axis represents the voltage level of incoming symbol patterns and the horizontal axis time. The overall eye pattern is an overlay of all possible patterns of signal rx(t). A data-recovery circuit 105 samples PAM-4 signal rx(t) in time with a clock signal clk_o to recover a two-bit digital signal d(k) [1:0]. An inner-eye phase-adjust-ment circuit 135 detects the signal eyes and adjusts the phase of clock signal clk_o responsive to the detected symbol eyes. This process aligns the data-sampling phase with timing centers of data eyes to promote improved timing margins and jitter tolerance.

In some embodiments, data-recovery circuit 105 may include an analog-to-digital converter (ADC) 110 that samples each incoming symbol on edges of receive clock signal clk_o to produce an M-bit digital signal rx'(k). A digital equalizer 115 may equalize signal rx'(k) to produce an M-bit equalized signal x(k) from which a symbol-decision circuit 120 extracts signal d(k). A clock-recovery circuit 125 may generate receive clock signal clk_o using an input clock signal clk_i, and phase adjusts receive clock signal clk_o to align the edges of clock signal clk_o with the incoming symbols. An error-computation circuit 130 and inner-eye phase alignment circuit 135 together may develop a clock-adjustment signal clkadj from recovered data. Level-detection circuitry 140 detects threshold levels Vth [2:0], symbol levels Vs [3:0], and eye measurement hinner from properties of equalized signal x(k) and uses these levels for symbol decisions and receiver calibration.

In some embodiments, eye diagram 150 illustrates the levels provided by level-detection circuit 140. The vertical axis represents the voltage level of incoming symbol patterns and the horizontal axis time. Three successive sample instants are t=k−1, t=k, and t=k+1. A single black path 155 represents input signal rx(t) expressing three symbol values S0, S3, and S0, which can be interpreted as the binary sequence 00b, 11b, and 00b. Sample points, each a combination of a time and voltage demarcated using a circle, occur at three intersections of path 155 and sample instants t=k−1, t=k, and t=k+1.

In some embodiments, the overall eye pattern may be an overlay of all possible patterns of signal rx(t). The white spaces of diagram 150 represent the areas—the product of their ranges of time and voltage—that are not traversed by any input pattern. Signal rx(t) is equalized to open these eyes, and thus to plainly distinguish the four possible symbols values S [3:0] at each sample instant. Inner-eye phase alignment circuit 135 calibrates sample timing based on inner-eye sample points, samples that occur within eye boundaries identified here using white rectangles sized to bound the eyes in voltage and time.

In some embodiments, voltage levels Vs [3:0] may represent the amplitudes of respective symbol levels and are separated from one another by eyes. These thresholds may be calibrated to the centers of the dark patches above, below, and between the eyes. Voltage levels Vth [2:0] represent decision thresholds for distinguishing symbol values. These three levels divide the range of voltages into four subranges, each subrange representing one of four symbol values S [3:0]. Voltage ranges $h_{inner}$, symmetrical about threshold level Vth2, are a measure of the extent of eye opening. Other values to be elucidated below are x(k), the amplitude of an equalized signal at a discrete time k; e(k), an error equal to the difference between amplitude x(k) and the mean amplitude of its corresponding symbol; and h(k), a symbol decision margin of sample x(k) that is less than $h_{inner}$ (i.e., $h(k)<h_{inner}$).

In some embodiments, eye diagram 150 is meant to represent an equalized version of analog input signal rx(t), a version that does not correspond to any node of receiver 100 but is used for illustrative purposes. In practice, input signal rx(t) is likely to suffer inter-symbol interference such that signal eyes would be malformed or missing. (Embodiments discussed below treat signal rx(t) to an analog equalizer to address this problem.) ADC 110 digitizes signal rx(t) on e.g., rising edges of clock signal clk_o to produce an M-bit sample at each time t. Digital equalizer 115 then equalizes the sampled signal to give a signal x(k) that can be understood as a digital version of eye diagram 150. In this embodiment, ADC 110 samples signal rx(t) at the symbol rate, which means signal x(k) will only have one discrete digital representation for each time t rather than a continuum across time as illustrated in diagram 150. Assuming M=6, for example, ADC 110 can sample signal rx(t) at times t to produce a sequence of sample values that range from zero to sixty-three. Digital equalizer 115 can then equalize signal rx'(k) to open the digital "eyes" in signal x(k). Eyes in equalized digital signal x(k) are sample values that do not occur as a function of input signal rx(t), and that separate collections of values of x(k) that indicate different symbol values.

In some embodiments, symbol decision circuit 120 may decide what symbol is represented by each value of signal x(k) and produces a sequence of two-bit symbols d(k) as a result. For example, any value of x(t) that falls between thresholds Vth0 and Vth1 is considered a symbol representative of a digital value of 01b. Output signal d(k) would therefore express the value 01b for that symbol.

In some embodiments, sample timing may be critical for symbol recovery. Sample-error computation circuit 130 and inner-eye phase alignment circuit 135 together adjust the phase of clock signal clk_o, and thus the sample timing of ADC 110, via a control signal clkadj. Sample-error computation circuit 130 issues an error signal e(k) that is the difference between M-bit sample x(k) and the mean amplitude of the corresponding symbol. At time t=k−1 in diagram 150, for example, x(k−1) is the digital value of path 155 at time t=k−1 and error e(k−1)=x(k−1)−Vs0. Signal x(k−1) is less than the mean symbol value Vs0 for the expressed symbol value, so e(k−1) is negative, or less than zero. At time t=k+1, signal x(k+1) is greater than mean symbol value Vs0, so e(k+1) is greater than zero.

In some embodiments, inner-eye phase alignment circuit 135 may use error samples e(k) and other signals to calibrate clock-adjustment signal clkadj. For the current symbol, at time t=k, phase-alignment circuit 135 computes a symbol decision margin h(k) that is the difference between x(k) and the nearest threshold voltage Vth, in this case Vth2. The value x(k) is within a signal eye if margin h(k) is less than $h_{inner}$. Symbol patterns for which an inner eye is detected are employed to make phase adjustments. Decision margin h(k) indicates whether a value of x(k) is an inner-eye detection, while a combination of margin h(k) and errors e(k−1), and e(k+1) provide a measure of the phase offset between the sample instants t provided by clock signal clk_o and the symbol centers. In diagram 150, the eyes mark the symbol centers and sample timing is plainly early relative to symbol timing. That is, the sample instants highlighted by vertical lines are offset to the left relative to the vertical centers of the data eyes.

Figure 2:
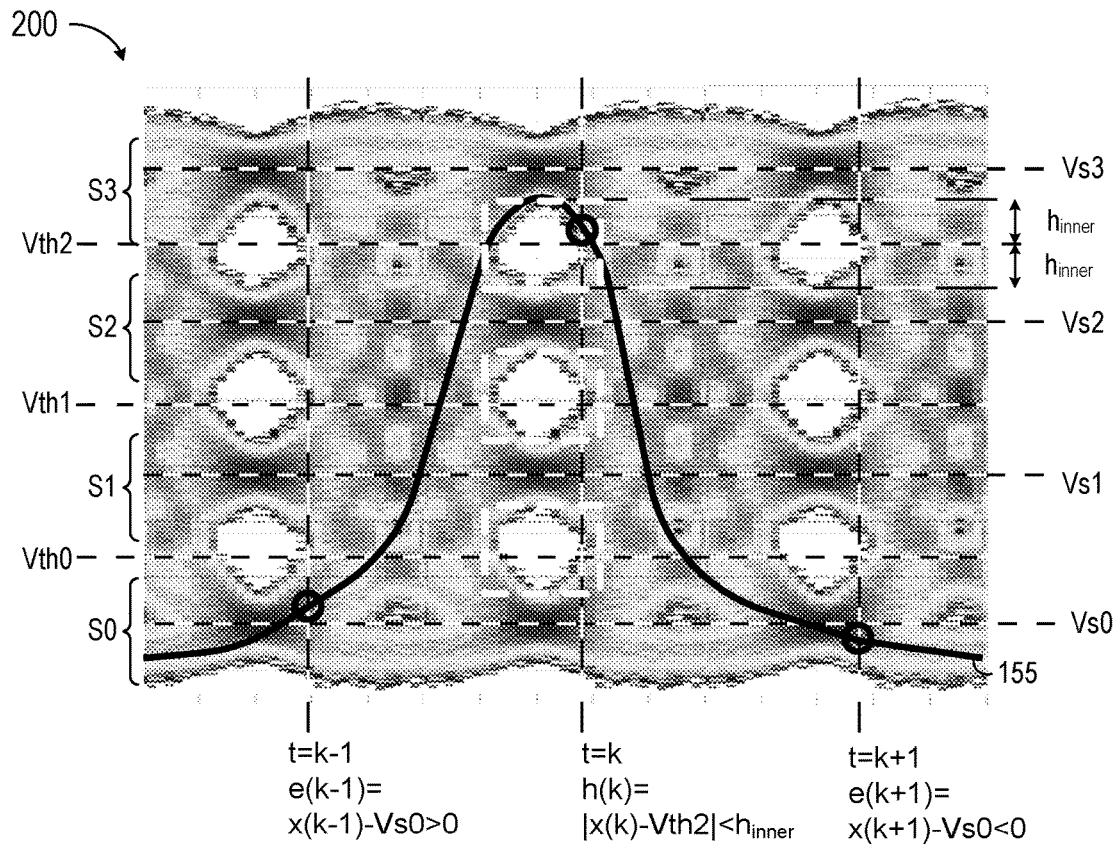
FIG. 2 depicts an eye diagram 200 like diagram 150 of FIG. 1, like-identified elements being the same, but with sample timing late-offset to the right-relative to symbol timing.

FIG. 2 depicts an eye diagram 200 similar to diagram 150 of FIG. 1, like-identified elements being the same, but with sample timing late—offset to the right—relative to symbol timing. In consequence of this late timing, error e(k−1) is greater than zero and error e(k+1) less than zero, conditions opposite those of the early-time example of diagram 150. Margin h(k) is again within an eye in this example.

FIG. 2 also includes a table 250 illustrating the operation of phase-alignment circuit 135. Table 250 list four cases in which alignment circuit 135 makes phase adjustments and the inputs that occur to phase-alignment circuit 135 in those conditions. Cases #1 and #2 both require that the current symbol d(k) be greater than both the prior symbol d(k−1) and the subsequent symbol d(k+1), and that margin h(k) be less than $h_{inner}$ to indicate that the current sample x(k) is within the voltage range of the current symbol eye. If prior error e(k−1) is less than zero and the subsequent error e(k+1) is greater than zero, a condition shown as Case #1 and illustrated in diagram 150, then phase alignment circuit 135 causes clock-recovery circuit 125 to delay clock signal clk_o, moving the sample instants closer to the center of the symbols. Turning to Case #2, if prior error e(k−1) is greater than zero and the subsequent error e(k+1) is less than zero, a condition illustrated in diagram 200, then phase alignment circuit 135 causes clock-recovery circuit 125 to advance clock signal clk_o, again moving the sample instants closer to the timing center of the symbols. Cases #3 and #4 are similar but make adjustments responsive to symbol patterns in which the current symbol is lower than the preceding and subsequent symbols. Other embodiments support more or different cases.

Figure 3:
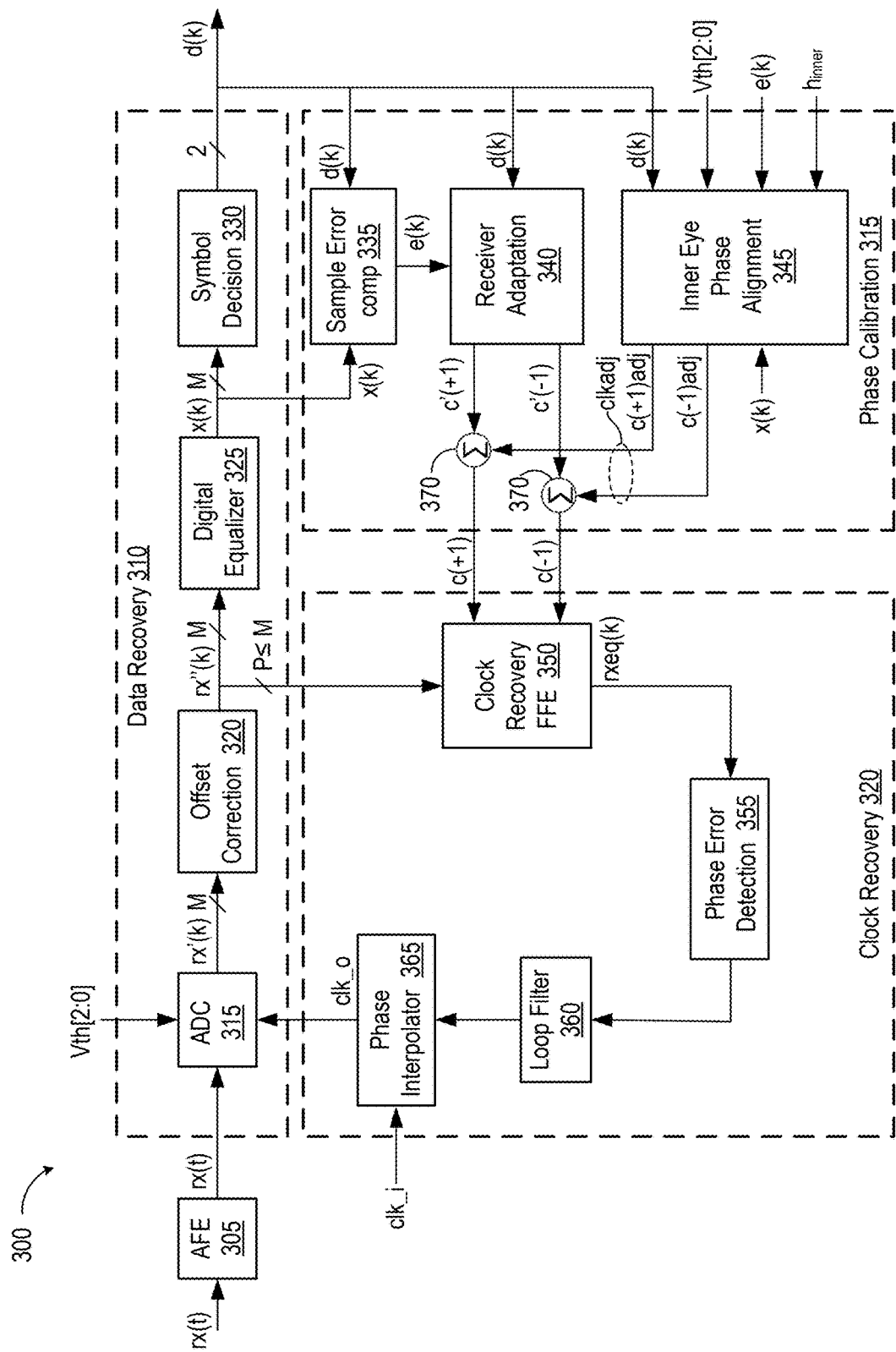
FIG. 3 depicts a PAM-N receiver 300 in accordance with another embodiment, where N=4 in this example.

FIG. 3 depicts a PAM-N receiver 300 in accordance with another embodiment, where N=4 in this example. Receiver 300 is like receiver 100 of FIG. 1 in some respects, with like-named elements being the same or similar. Receiver 300 includes an analog front end (AFE) 305, a data-recovery circuit 310, phase-calibration circuitry 315, and clock-recovery circuitry 320. AFE 305 includes components (not shown) such as amplifiers and filters to shape analog signal rx(t) for data recovery, components that are well known and thus omitted for brevity.

In some embodiments, data-recovery circuit 310 may include an ADC 315 that digitizes signal rx(t) on edges of a clock signal clk_o to present an M-bit digital version rx'(k) to an offset-correction circuit 320 that applies a DC offset based on an offset control signal (not shown) that can be established during calibration. The resulting M-bit digital signal rx"(k) is then presented to digital equalizer 325, which responsively produces an equalized M-bit digital signal x(k). If receiver 300 is properly calibrated, signal x(k) comprises a sequence of values grouped into four distinct ranges that respectively represent symbols S [3:0]. A decision circuit 330 decides which of symbols S [3:0] is represented by each sample value for x(k) and issues a corresponding stream of two-bit data values d(k).

In some embodiments, phase-calibration circuitry 315 may control clock-recovery circuit 320 responsive to M-bit samples x(k) and symbol decisions d(k). A sample-error computation circuit 335, receiver-adaptation circuit 340, and inner-eye phase alignment circuit 345 together adjust the phase of clock signal clk_o, and thus the sample timing of ADC 315. Clock-recovery circuit 320 includes a feed-forward equalizer 350, a phase-error detector 355, a loop filter 360, and a phase interpolator 365. Feed-forward equalizer 350 can be adjusted by changing one or both of a post-cursor tap value c(+1) or a pre-cursor tap value c(−1) to equalize a P-bit version of input signal rx"(k) where P is less than or equal to M. Clock recovery FFE 350 equalizes P-bit signal rx"(k) with a reduced number of taps rather than all M bits and taps and so can be simpler and more power and area efficient than equalizer 325. Equalized signal rxeq(k) stimulates phase-error detection circuit 355 to send a phase-error signal to loop filter 360. Loop filter 360 responsively controls phase interpolator 365 to adjust the phase of clock signal clk_o. Phase-calibration circuit 315 adjusts the tap values c(−1) and c(+1) to equalizer 350 to adjust signal rxeq(k), and thus alter the phase of clock signal clk_o.

In some embodiments, sample-error computation circuit 335 may issue an error signal e(k) that is the difference between sample x(k) and the mean amplitude of the corresponding symbol, a function discussed previously in connection with computation circuit 130 of FIG. 1. Receiver-adaptation circuit 340 issues tap-value adjustments c' (+1) and c' (−1) to a respective pair of summing circuits 370 to effect changes in tap values c (+1) and c (−1), changes that tend to align clock signal clk_o with incoming symbols of signal rx(t). Phase-alignment circuit 345 further contributes to signals c (+1) and c (−1) by issuing phase-adjustment signals c (+1) adj and c (−1) adj to respective summing circuits 370. Phase-alignment circuit 345 develops signals c (+1) adj and c (−1) adj in the manner detailed above in connection with FIGS. 1 and 2.

In some embodiments, clock-recovery FFE 350 may have fewer taps and lower-resolution input signals than data equalizers 325 in the data path. FFE 350 saves area and power, but the eye centers at rxeq(k) can be offset from those of symbols x(k). The inclusion of inner-eye phase alignment circuitry 345 locks clock signal clk_o to the timing center of inner data-eyes, and in doing so improves timing margins and jitter tolerance. Phase-alignment circuitry 345 makes adjustments based on measures of individual eyes so phase adjustments are based on worst-case symbol transitions rather than e.g., average symbol transitions.

In some embodiments, receiver 300 may produce a two-bit output signal d(k) responsive to input signal rx(t). Other embodiments divide receiver 300 into R slices each operating at a data rate of 1/R times that of signal rx(t) with a timing offset of one symbol time of signal rx(t) relative to the neighboring slice. The R slices thus process symbols of input signal rx(t) in parallel to relax timing constraints on receiver 300. The number of DFE slices is thirty-two (R=32) in one embodiment.

Figure 4:
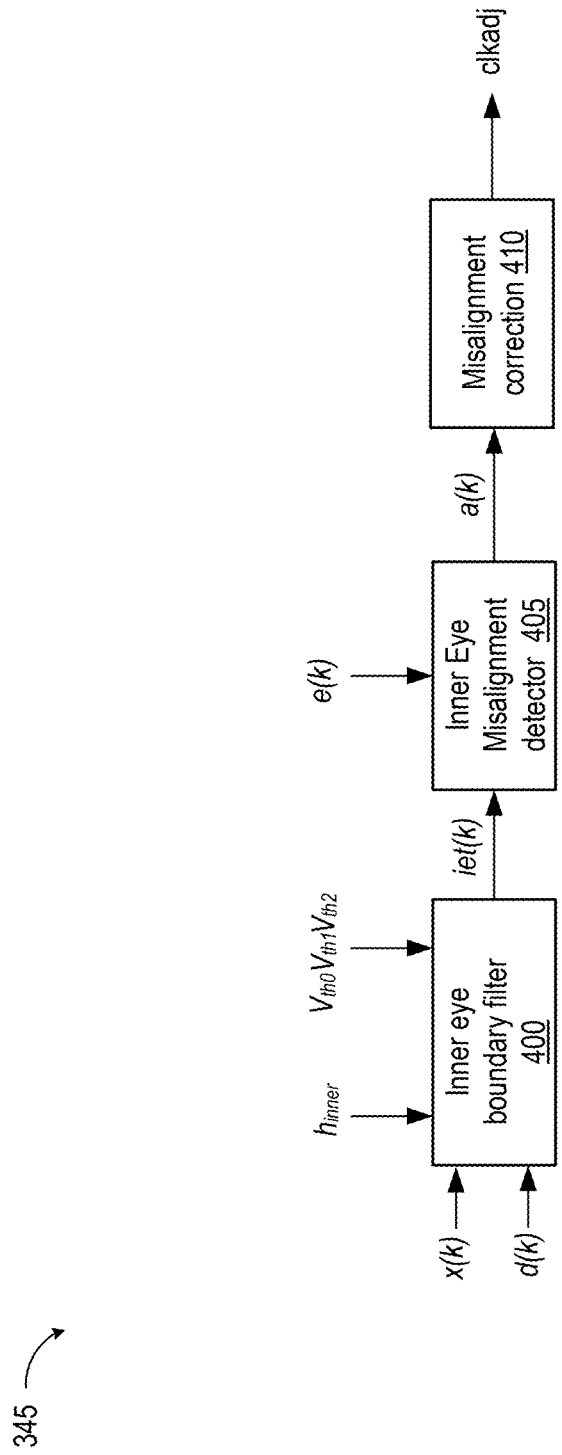
FIG. 4 depicts an embodiment of inner-eye phase alignment circuitry 345 of FIG. 3.

FIG. 4 depicts an embodiment of inner-eye phase alignment circuitry 345 of FIG. 3. Phase-alignment circuitry 345 includes an inner-eye boundary filter 400 that detects symbol eyes along the voltage dimension and, for each such detection, issues an inner-eye transition signal iet(k). An inner-eye misalignment detector 405 responds to each transition iet(k) with a measure of alignment error a(k) indicative of timing misalignment of clock signal clk_o with respect to input signal rx(t). A misalignment-correction circuit 410 may make adjustments to signal clkadj that tend to reduce alignment error a(k).

Figure 5:
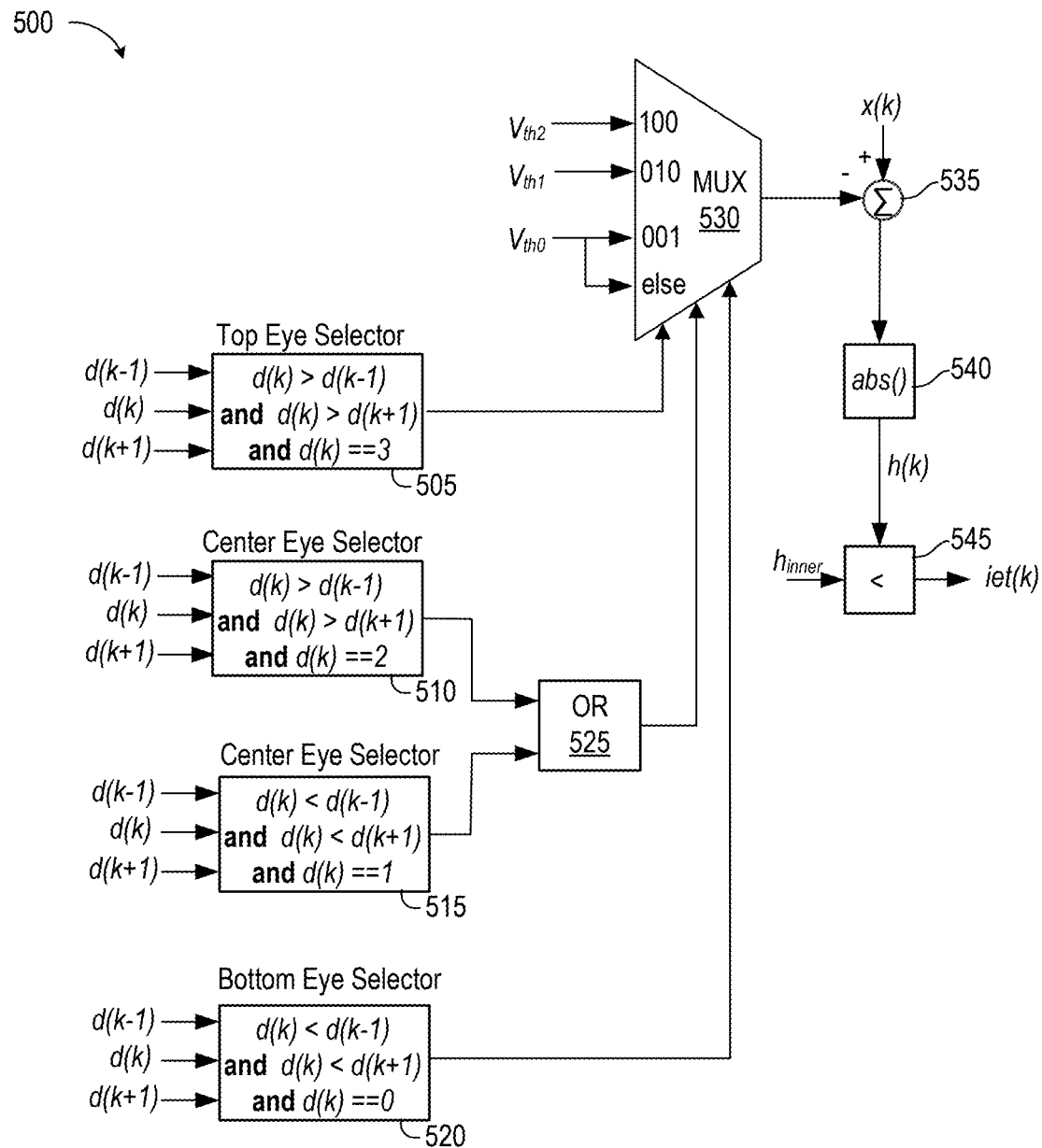
FIG. 5 depicts an inner-eye boundary filter 500.

FIG. 5 depicts an inner-eye boundary filter 500 used as boundary filter 400 of FIG. 4 in one embodiment to detect whether samples x(k) are within signal eyes. Filter 500 includes four eye selectors 505, 510, 515, and 520 that assert their respective output signal when a data pattern d(k−1), d(k), d(k+1) accompanies one of four types of eyes. The two center-eye selectors 510 and 515 distinguish between symbols that are above and below center threshold level Vth1. An OR gate 525 indicates a center eye if either of selectors 510 and 515 indicates a center eye. A multiplexer 530 conveys one of threshold levels Vth [2:0] to a summing circuit 535, which adds the threshold value to the current equalized sample x(k). A circuit 540 takes the absolute value of this difference to produce margin h(k). A comparator 545 determines whether margin h(k) is less than $h_{inner}$, a condition that indicates the current equalized sample x(k) is within an eye. Comparator 545 responsively issues an inner-eye transition signal iet(k) to identify the sensed eye.

Figure 6:
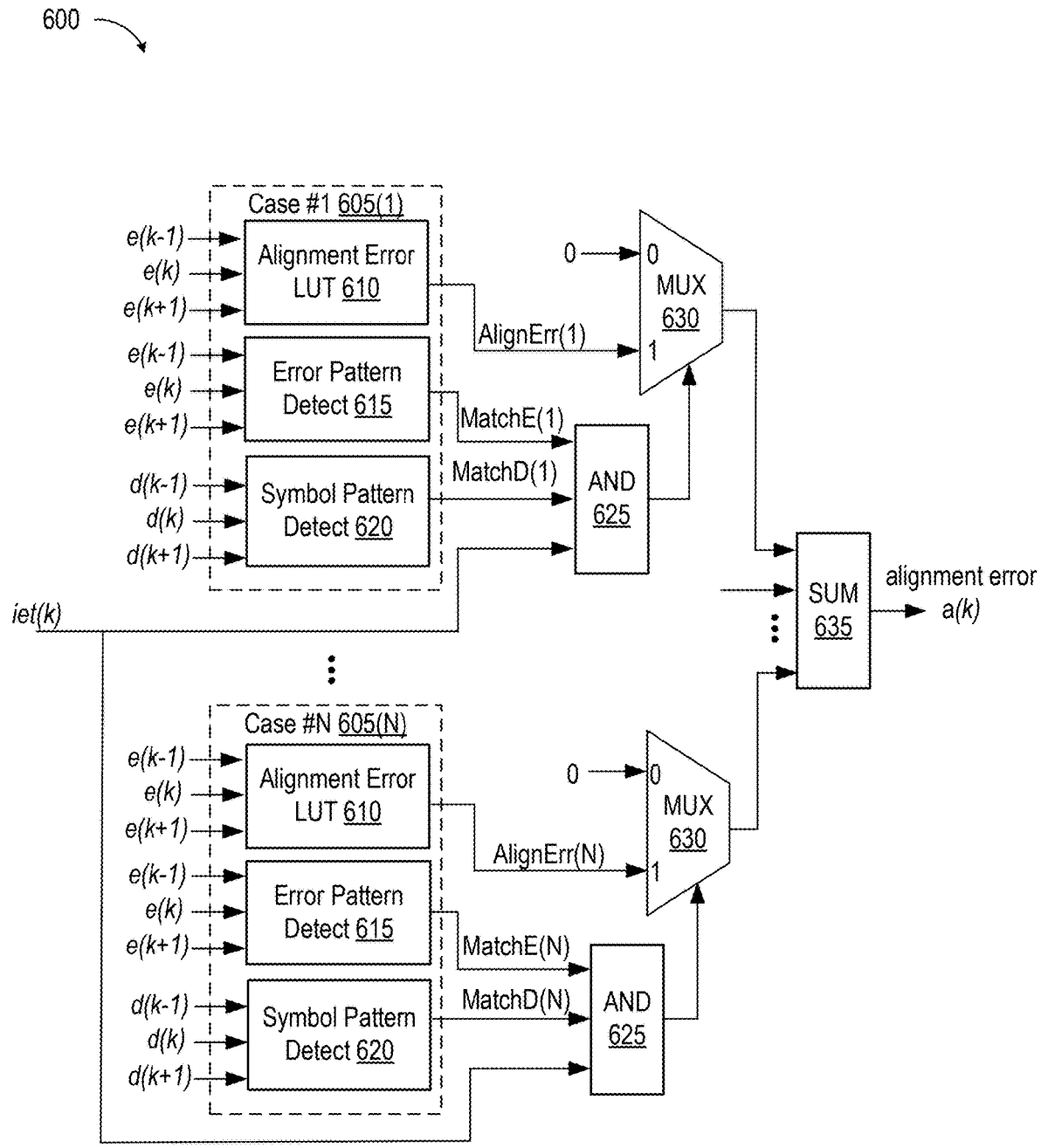
FIG. 6 depicts an inner-eye misalignment detector 600.

FIG. 6 depicts an inner-eye misalignment detector 600 used as detector 405 of FIG. 4 in one embodiment to detect an extent to which clock signal clk_o is misaligned. The input circuitry for filter 600 is divided into N blocks 605, each of which represents the logic described for one of cases Case #1-4 in FIG. 2. The bottom input block 505 (N) represents Case #4 (N=4) in this example, but N is not limited to four.

In some embodiments, each input block 605 may include an alignment-error look-up table (LUT) 610 that stores values calibrated to specify an increment of phase adjustment for a given error pattern; an error-pattern detect circuit 615 that issues a match signal MatchE when the equations listed for the corresponding case in the third column Error of table 250 in FIG. 2 are satisfied; and a symbol-pattern detector 620 issues a match signal MatchD when the equations listed for the corresponding case in the first column Symbol Decision of table 250 are satisfied. For each block 605, an AND gate 625 enables a multiplexer 630 to select alignment-error signal AlignErr from the corresponding block and pass it to a summing circuit 635. The overall alignment error a(k) is the sum of the alignment errors from blocks 605[N:1] and can be positive or negative depending upon whether the timing of clock signal clk_o is late or early with respect to signal rx(t).

Figure 7:
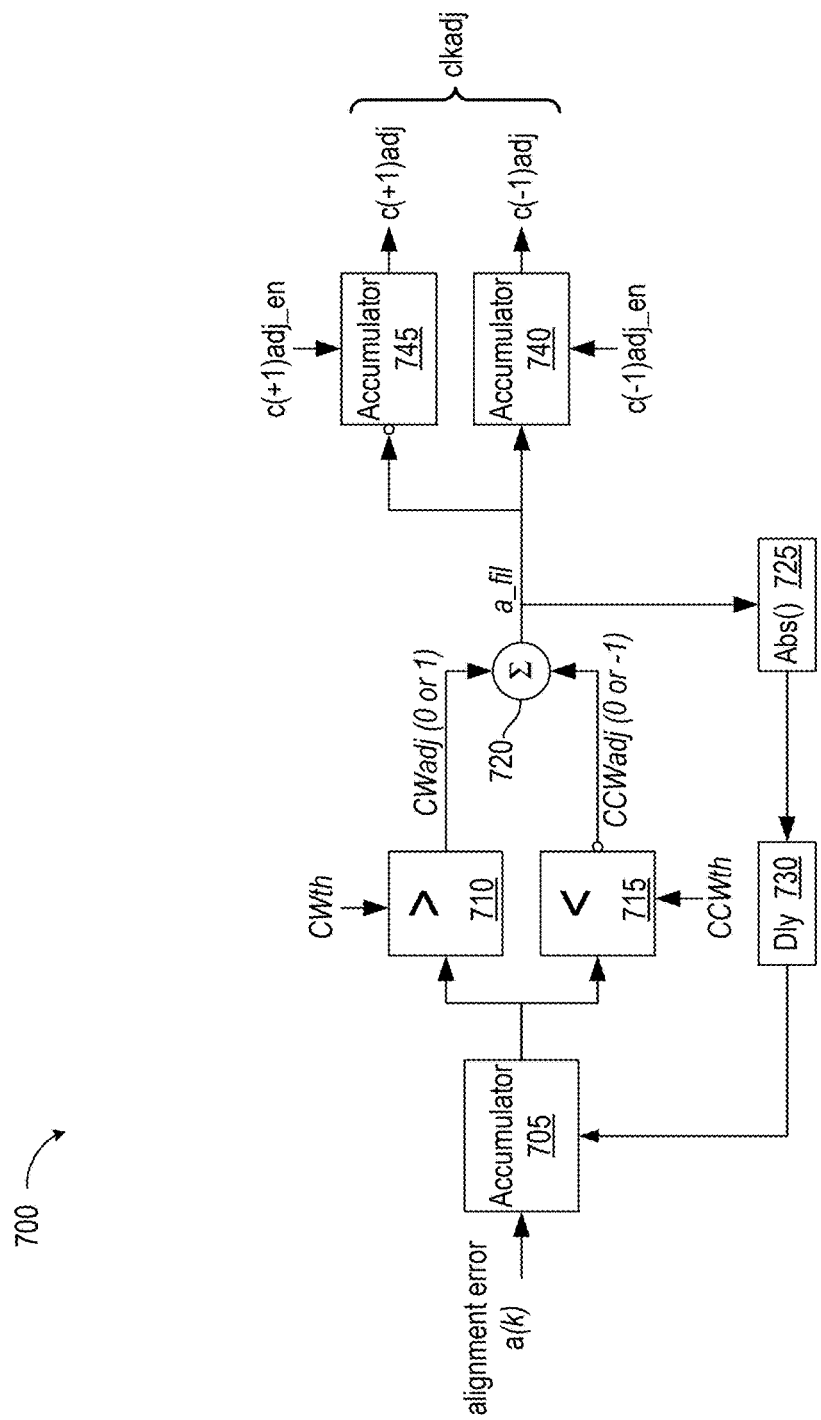
FIG. 7 depicts a misalignment correction circuit 700.

FIG. 7 depicts a misalignment correction circuit 700 that can be used to implement misalignment correction circuit 410 of FIG. 4. Alignment error a(k) is fed into an accumulator 705 that sums instances of alignment error a(k) to act as a low-pass filter. Comparators 710 and 715 compare the accumulated errors a(k) against respective threshold values CWth and CCWth to determine whether the phase of clock signal clk_o should be adjusted and in which direction. If early, indicated when the accumulated alignment error is greater than value CWth, then comparator 710 asserts a signal CWadj (from zero to one) to a summing node 720. If late, indicated when the accumulated alignment error is less than the value CCWth, then comparator 715 asserts signal CWadj (from zero to negative one) to summing node 720. A feedback element 725 applies the absolute value of the output of summing node 720 to a delay element 730, which resets accumulator 705 to zero if the absolute value is one.

In some embodiments, the filtered error signal a_fil from summing node 720 is a logic one when clock signal clk_o is early and a negative one when clock signal clk_0 is late. An accumulator 740 increments or decrements for each instance of a_fil being positive or negative, respectively. The count within accumulator 745 is adjustment signal c (−1) adj used in receiver 100 of FIG. 1 to offset pre-cursor tap c (−1). Another accumulator 745 with an inverting input decrements and increments opposite accumulator 740 to produce the adjustment signal c (+1) adj used to offset post-cursor tap c (+1). Accumulators 740 and 745 have respective enable inputs c (−1) adj_en and c (+1) adj_en that allow accumulators to be enabled for calibration.

Figure 8:
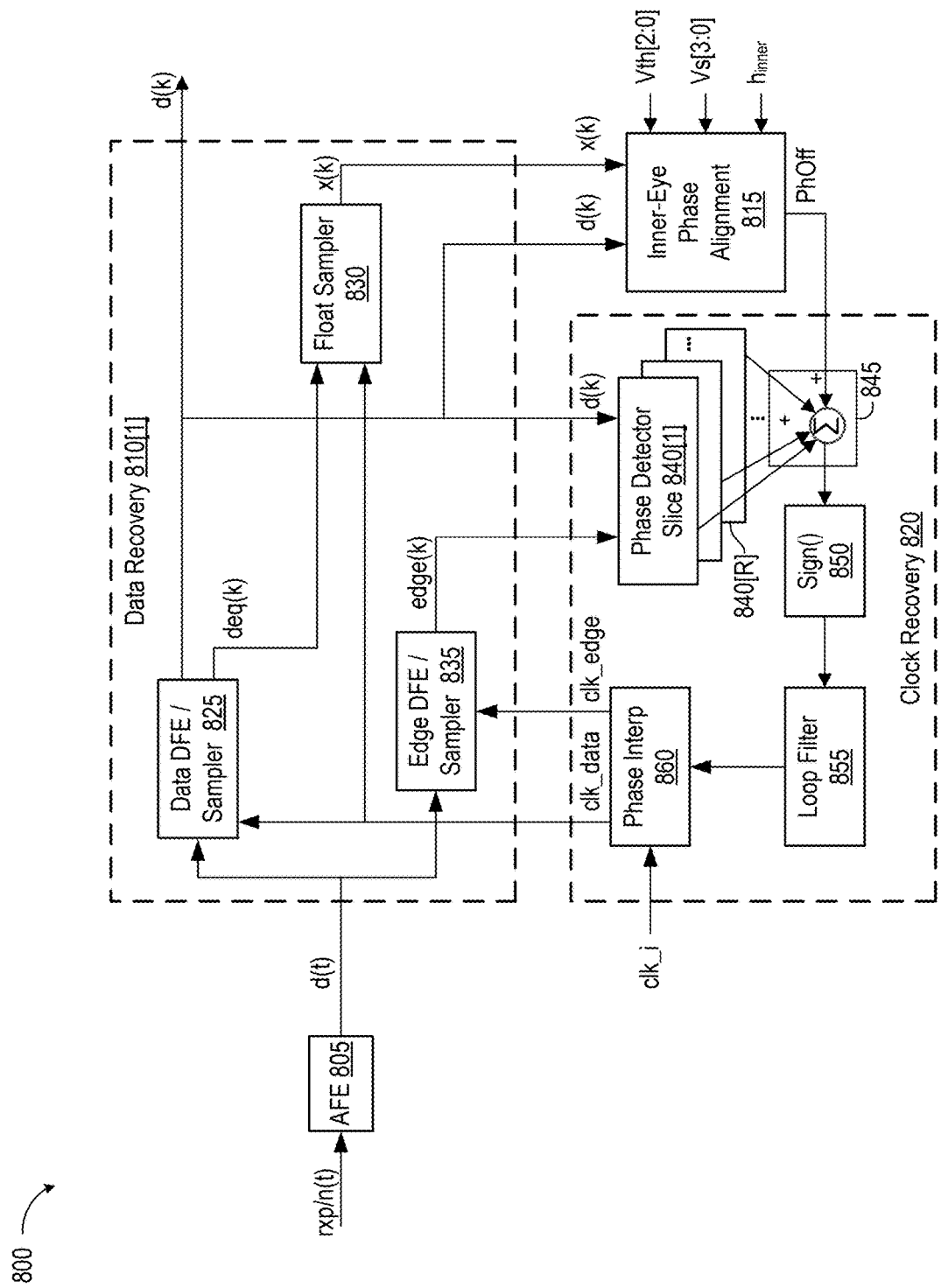
FIG. 8 depicts an analog receiver 800 with an inner-eye phase alignment circuit 815.

FIG. 8 depicts a receiver 800 in accordance with another embodiment. Receiver 800 includes an AFE 805, a data-recovery circuit 810, an inner-eye phase alignment circuit 815, and a clock-recovery circuit 820. AFE 805 conditions a complementary PAM-4 signal rxp/n(t) to produce analog data signal d(t), the input to data-recovery circuit 810. Data-recovery circuit 810 includes a decision-feedback equalizer (DFE) with samplers 825 that equalizes data signal d(t) and samples the equalized data signal on edges of a data clock clk_data to recover two-bit digital signal d(k), a digital representation of received signal rxp/n(t). Block 825 also produces a signal deq(k) that is a measure of the amplitude of the equalized data signal before sampling. Signals deq(k) and data clock signal clk_data are conveyed to a float sampler 830 that issues a signal x(k) that is the amplitude of the equalized signal at time k. Circuit 810 additionally includes a second DFE with samplers 835 that equalizes signal d(t) and samples the equalized signal in time with incoming symbol transitions, or "edges," in time with an edge clock clk_edge to produce edge sample edge(k).

In some embodiments, inner-eye phase alignment circuit 815 may function in the manner of phase-alignment circuit 345 of FIG. 3 but incorporates computation circuit 335 to compute errors e(k) from signals x(k) and d(k) and produces a single phase-offset signal PhOff in lieu of equalizer tap adjustments.

In some embodiments, clock recovery circuit 820 may include a phase detector 840 divided into R slices. Each slice serves a corresponding data-recovery circuit 810, though all but one circuit 810 [1] are omitted here for ease of illustration. Clock signals clk_data and clk_edge are offset from one another by ninety degrees so that edge samples occur during symbol transitions when data clock signal clk_data is centered on the symbols. Phase detector 840 detects the phase of data clock clk_data by comparing the value of sampled edges with sampled data. A summing node 845 adds the resulting offset to similar offsets from data-recovery circuits 810[R:2] from other slices and to phase-offset signal PhOff from inner-eye phase alignment circuit 815. Summing node 845 presents the resulting sum to a sign element 850 that issues a binary value indicative of the sign of the sum to a phase interpolator 860 that adjusts the phases of clock signals clk_data and clk_edge to reduce clock-phase misalignment with symbols of signal d(t).

Figure 9:
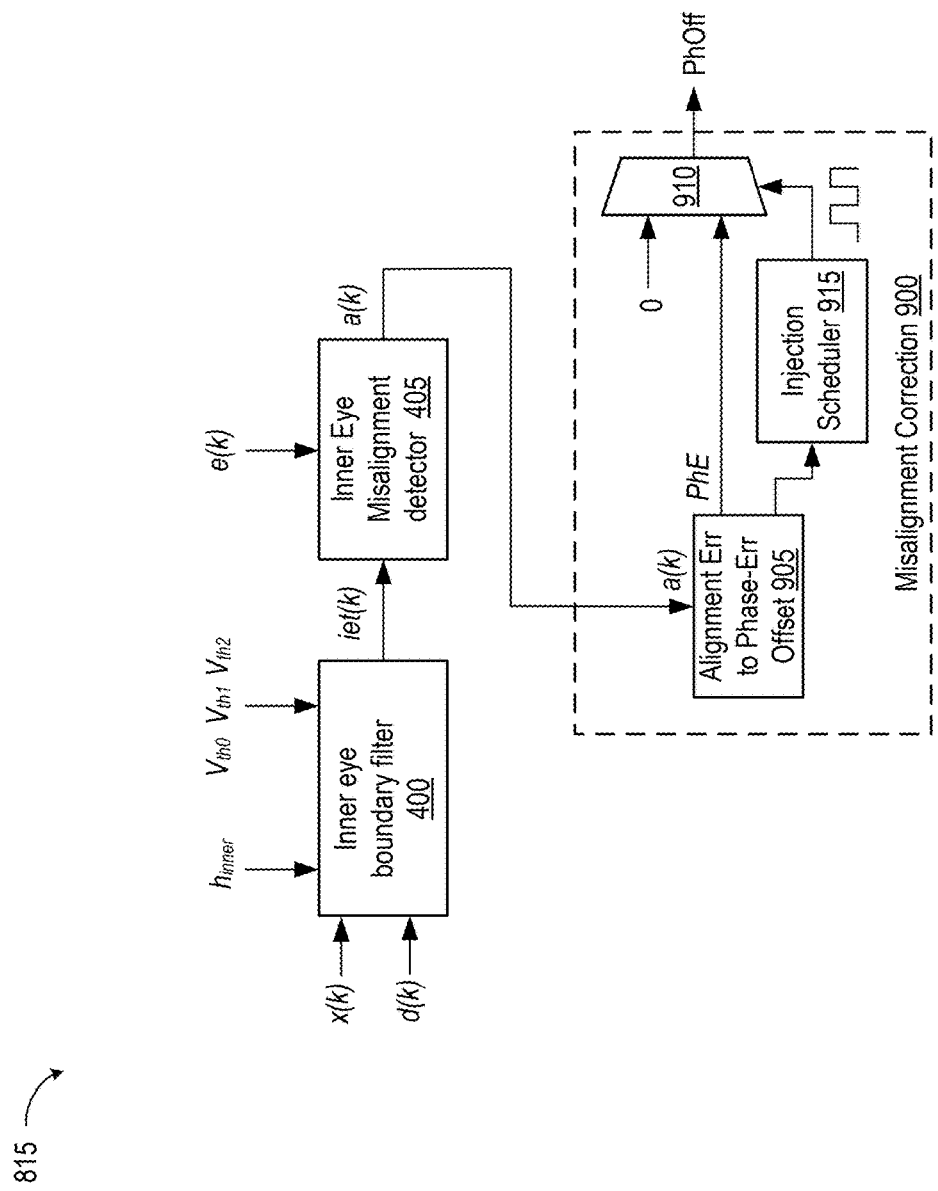
FIG. 9 depicts an embodiment of inner-eye phase-alignment circuit 815 of FIG. 8.

FIG. 9 depicts an embodiment of inner-eye phase-alignment circuit 815 of FIG. 8. The first two blocks are a boundary filter 400 and misalignment detector 405 that are discussed above in connection with FIG. 4. The last element is a misalignment-correction circuit 900 that adjusts phase-offset signal PhOff responsive to alignment error a(k). Correction circuit 900 includes a circuit 905 that converts alignment error a(k) to a phase-error offset PhE to a multiplexer 910. Circuit 905 controls an injection scheduler 915 that in turn controls multiplexer 910 to convey the offset as signal PhOff. Injection scheduler 910 spreads error injection over multiple clock cycles for improved phase-offset resolution.

Figure 10:
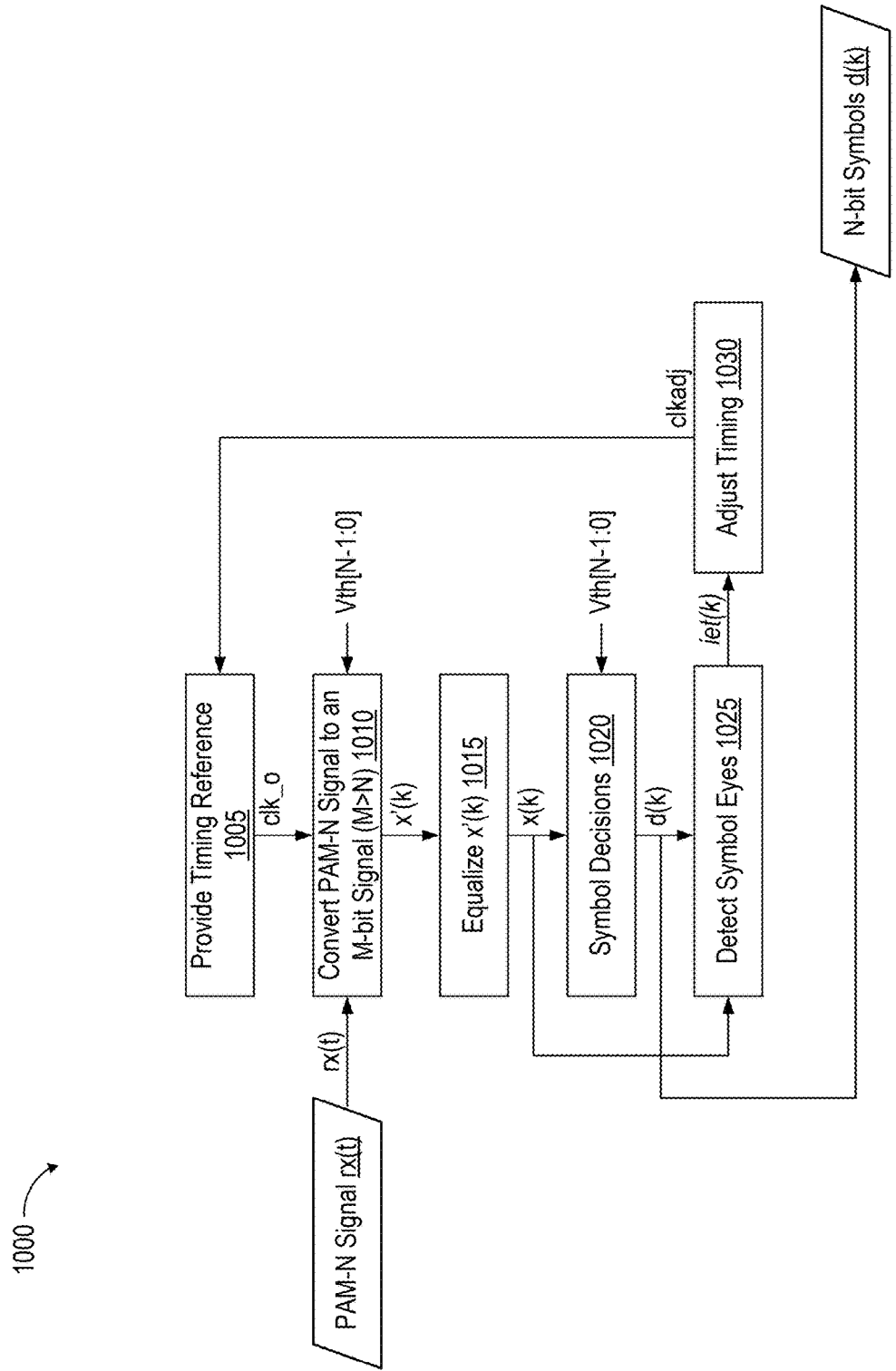
FIG. 10 is a flowchart 1000 illustrating a method of recovering N-bit symbols d(k) from an analog PAM-N signal rx(t).

FIG. 10 is a flowchart 1000 illustrating a method of recovering N-bit symbols d(k) from an analog PAM-N signal rx(t). Signal names are and corresponding nodes are the same as or similar to like-identified elements noted previously. Signal rx(t) represents a series of symbols that each occur over a unit interval. In step 1005, a receiver develops a periodic timing reference, such as a clock or a strobe, that transitions within each unit interval. The timing reference is clock signal clk_o in this example. An ADC converts PAM-N signal rx(t) into an M-bit digital signal x'(k), where M is greater than N (step 1010). The digitized signal x'(t) is then equalized to produce an equalized M-bit digital signal x(t) (1015).

In step 1020, digital symbols of signal x(t) are evaluated against a threshold or thresholds Vth [N−1:0] to produce a sequence of N-bit decisions represented as signal d(k). Symbol eyes are then detected using a combination of symbols x(k) and d(k) (step 1025). Detected eyes are indicated by asserting inner-eye transition signal iet(k), which stimulates a timing adjustment (step 1030) that phase shifts timing reference clk_o to reduce phase misalignment between the PAM-N symbols of signal rx(t) and the transitions of clock signal clk_o. The resultant alignment reduces the bit-error rate of N-bit digital symbols d(k) derived from PAM-N signal rx(t).

While the invention has been described with reference to specific embodiments thereof, it will be evident that various modifications and changes may be made thereto without departing from the broader spirit and scope of the invention. Variations of these embodiments will be apparent to those of ordinary skill in the art upon reviewing this disclosure. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A receiver comprising:
an input node to receive an amplitude-modulated input signal expressed as a series of symbols, each symbol representing N-bit data and the symbols collectively forming signal eyes;
a data-recovery circuit to convert the amplitude-modulated input signal into an M-bit digital signal in time with a clock signal phase aligned with the symbols, where M is greater than N, and to convert the M-bit digital signal to an N-bit digital signal;
a clock-recovery circuit to phase align the clock signal; and
an inner-eye phase-adjustment circuit coupled to the data-recovery circuit and the clock-recovery circuit, the inner-eye phase adjustment circuit to detect the signal eyes from the M-bit digital signal and adjust the phase of the clock signal responsive to the detected symbol eyes.

2. The receiver of claim 1, the clock-recovery circuit including an equalizer coupled to the data-recovery circuit to equalize P bits of the M-bit digital signal, where P is less than or equal to M.

3. The receiver of claim 2, the equalizer including at least one tap, wherein the inner-eye phase-adjustment circuit adjusts the at least one tap responsive to the detected symbol eyes.

4. The receiver of claim 1, the inner-eye phase-adjustment circuit including an inner-eye boundary filter to detect an amplitude of the eyes and an inner-eye misalignment detector to detect a phase error between the eyes and the clock signal.

5. The receiver of claim 4, wherein the eyes have an average eye area, wherein the eye area is a product of eye amplitude and eye duration, and the inner-eye boundary filter filters areas smaller than the average eye area.

6. A receiver comprising:
a data-recovery circuit to receive an amplitude-modulated input signal expressed as a series of symbols, each symbol representing N-bit data, the data-recovery circuit including:
an analog-to-digital converter to digitize the amplitude-modulated input signal to an M-bit digital signal, where M is greater than N, in time with a receive clock signal phase aligned with the symbols;
a data equalizer to equalize the M-bit digital signal to produce an M-bit equalized signal expressing the series of symbol as a series of digital values, the series of digital values collectively forming symbol eyes; and a decision circuit to convert the M-bit equalized signal to an N-bit received signal;

a clock-recovery circuit coupled to the data-recovery circuit to phase adjust the receive clock signal with the symbols responsive to at least P bits of the M-bit digital signal; and an inner-eye phase-adjustment circuit coupled to the data-recovery circuit to detect the timing of the symbol eyes and coupled to the clock-recovery circuit to phase adjust the receive clock signal responsive to the detected timing of the symbol eyes.

7. The receiver of claim 6, wherein P is less than or equal to M, the clock-recovery circuit including a clock-recovery equalizer to equalize the P bits of the M-bit digital signal to produce a P-bit equalized signal expressing the series of symbol as a second series of digital values.

8. The receiver of claim 7, further comprising a receiver-adaptation circuit coupled to the data-recovery circuit and the clock-recovery circuit to phase adjust the receive clock signal responsive to the M-bit equalized signal and the N-bit received signal.

9. The receiver of claim 7, further comprising a phase detector coupled to the data-recovery circuit to phase adjust the receive clock signal responsive to the N-bit received signal and sampled edges of the amplitude-modulated input signal.

10. The receiver of claim 6, wherein N is two, P is greater than two, and M is greater than or equal to P.

11. The receiver of claim 6, wherein the inner-eye phase-adjustment circuit includes an inner-eye boundary filter to detect the symbol eyes and an eye-misalignment detector to detect a misalignment between the timing center of inner symbol eyes and edges of the receive clock signal.

12. The receiver of claim 11, further comprising a low-pass filter coupled the misalignment detector to initiate the phase adjustment to the receive clock signal when the misalignment is detected an accumulated number of times.

13. A receiver comprising:
a data node to convey an amplitude-modulated signal expressed as a series of symbols and symbol transitions, each symbol representing N-bit data;
a data sampler to issue data samples of the symbols;
an edge sampler to issue edge samples of the symbol transitions;
a clock-recovery circuit coupled to the data sampler and the edge sampler, the clock-recovery circuit to issue a data clock signal to the data sampler and an edge clock signal to the edge sampler; and
an inner-eye phase-adjustment circuit coupled to the data sampler and the clock-recovery circuit, the inner-eye phase-adjustment circuit to detect voltages and timings within the symbol eyes and phase adjusting the data clock signal responsive to the detected voltages and timings.

14. The receiver of claim 13, further comprising an analog front end to receive an input signal and convey the amplitude-modulated signal responsive to the input signal.

15. The receiver of claim 13, the inner-eye phase-adjustment circuit including an inner-eye boundary filter to sense the symbol transitions.

16. The receiver of claim 15, wherein the sensed transitions are a subset of the set of the transitions.

17. The receiver of claim 15, further comprising an inner-eye misalignment detector coupled to the inner-eye boundary filter to detect a timing misalignment between the symbols and the data clock signal.

18. The receiver of claim 17, further comprising a misalignment-correction circuit coupled to the inner-eye misalignment detector to issue a phase-offset signal to the clock recovery circuit responsive to the detected timing misalignment.

19. The receiver of claim 18, wherein the misalignment-correction circuit includes a scheduler to schedule the issuance of the phase-offset signal to the clock-recovery circuit.

20. The receiver of claim 13, wherein each of the symbols represents two-bit data.

* * * * *